US009007416B1

(12) United States Patent
Murgia et al.

(10) Patent No.: US 9,007,416 B1
(45) Date of Patent: Apr. 14, 2015

(54) LOCAL SOCIAL CONFERENCE CALLING

(75) Inventors: Carlo Murgia, Sunnyvale, CA (US);
Eric Skup, Sunnyvale, CA (US)

(73) Assignee: Audience, Inc., Mountain View, CA (US)

(*) Notice: Subject to any disclaimer, the term of this patent is extended or adjusted under 35 U.S.C. 154(b) by 241 days.

(21) Appl. No.: 13/415,535

(22) Filed: Mar. 8, 2012

Related U.S. Application Data

(60) Provisional application No. 61/450,500, filed on Mar. 8, 2011.

(51) Int. Cl.
*H04N 7/14* (2006.01)
*H04M 3/56* (2006.01)

(52) U.S. Cl.
CPC ........................................ *H04M 3/56* (2013.01)

(58) Field of Classification Search
None
See application file for complete search history.

(56) References Cited

U.S. PATENT DOCUMENTS

| | | | |
|---|---|---|---|
| 7,685,132 B2 * | 3/2010 | Hyman | 707/999.01 |
| 2007/0081075 A1 * | 4/2007 | Canova et al. | 348/14.08 |
| 2009/0323655 A1 * | 12/2009 | Cardona et al. | 370/338 |
| 2010/0217837 A1 * | 8/2010 | Ansari et al. | 709/218 |
| 2011/0173542 A1 * | 7/2011 | Imes et al. | 715/735 |
| 2011/0280154 A1 * | 11/2011 | Silverstrim et al. | 370/254 |
| 2012/0202458 A1 * | 8/2012 | Speicher | 455/408 |
| 2012/0231778 A1 * | 9/2012 | Chen et al. | 455/418 |
| 2012/0250882 A1 * | 10/2012 | Mohammad et al. | 381/94.1 |

* cited by examiner

*Primary Examiner* — Maria El-Zoobi
(74) *Attorney, Agent, or Firm* — Carr & Ferrell LLP

(57) ABSTRACT

Provided are systems and methods for communicating between mobile devices. Such methods involve establishing a communication session between the mobile devices using a local network, such as a Wi-Fi network. The methods also involve transmitting data streams from one mobile device in the group to all other mobile devices using this local network. The data streams may include audio and/or video data generated by the mobile devices. For example, mobile device users may conduct a teleconference through the local network and/or share media. The mobile devices may be interconnected using a star or ring topology, which may depend on distances between participants and/or alarm features that reflect connection losses between the mobile devices. Each mobile device may be equipped with one or more microphones for collecting audio signals from its user. A mobile device may also include an audio processing system for noise suppression and/or echo cancellation.

20 Claims, 5 Drawing Sheets

LOCAL SOCIAL CONFERENCE CALLING

CROSS-REFERENCE TO RELATED APPLICATIONS

This application claims the benefit of U.S. Provisional Application No. 61/450,500, filed Mar. 8, 2011. The disclosure of the aforementioned application is incorporated herein by reference in its entirety.

FIELD

This application relates generally to communicating between multiple mobile devices and more specifically to establishing a communication session between such mobile devices using a local communication network and transmitting a data stream from one mobile device to all other mobile devices using this network.

BACKGROUND

Teleconferencing is an essential and indispensable part of today's world. It is a cost effective alternative to face-to-face meetings and allows bringing together people throughout the world to exchange ideas in a real time, interactive manner. A teleconference may be defined as a live exchange and mass articulation of information among two or more people who are remote from one another but linked by a telecommunication system. Other terms that are sometimes used include audio conferencing, telephone conferencing, and phone conferencing.

Various telecommunication systems may be used for teleconferencing. Some examples include telephone systems, voice over internet protocol (VoIP) systems, and other like systems. Teleconferencing may be used as a part of video conferencing, audio streaming, and other types of interactive exchanges that include an audio component. Often a group of participants sharing video and/or audio with each other do not have access to telephone systems. For example, a group of bicyclists may be interested in chatting with each other and listening to the same music while riding. However, a ride may go through locations with limited cell phone connectivity. As such, calling a conference number may not be an option. At the same time, in this and many other examples, all members may be sufficiently close to each other to establish a direct communication with each other through a local network.

SUMMARY

Provided are systems and methods for communicating between multiple mobile devices. Such methods involve establishing a communication session between the mobile devices using a local communication network, such as a Wi-Fi network. The methods also involve transmitting data streams from one mobile device in the group to all other mobile devices using this local network. The data streams may include audio and/or video data generated and/or provided by the mobile devices. For example, mobile device users may conduct a teleconference and/or share media through the local network. The devices may be interconnected using a star topology or a ring topology, which may depend on the distances between participants and/or alarm features that reflect connection losses between the devices. Each mobile device may be equipped with one or more microphones for collecting audio signals from its user. A mobile device may also include an audio processing system for noise suppression and/or echo cancellation.

In certain embodiments, a method for communicating between mobile devices in a plurality of mobile devices involves establishing a communication session between mobile devices in the plurality of mobile devices using a local communication network and transmitting the data stream from one mobile device to the remaining mobile devices using the local communication network. Each mobile device in the plurality of mobile devices may include a communication link for connecting to one or more other devices in the plurality of mobile devices. Each mobile device in the plurality of mobile devices may also include at least one microphone and an audio processing system configured to perform noise suppression and/or echo cancellation. Furthermore, each mobile device in the plurality of mobile devices may be configured to produce a data stream for communicating to one or more other devices in the plurality of devices. One example of a local communication network, which may be used to interconnect multiple mobile devices, is a Wi-Fi network.

In certain embodiments, mobile devices in the plurality of mobile devices are interconnected according to a ring topology. In other embodiments, mobile devices in the plurality of mobile devices are interconnected according to a star topology. In these embodiments, establishing the communication session between mobile devices using the local communication network may involve selecting a master device from the plurality of mobile devices to establish the star topology. This selection may be performed by a user of the master device.

In certain embodiments, the method involves verifying connections between mobile devices in the plurality of mobile devices. If any mobile device in the plurality of mobile devices is found to be disconnected, the method may proceed with sending an alarm to the plurality of mobile devices. Any device in the local network may perform connectivity verification and may generate and transmit an alarm. The connection verification operation may be repeated at predetermined intervals, such as certain time intervals.

One example of mobile devices includes mobile phones. However, any devices capable of connecting and/or establishing a local network may be used. The mobile devices typically include microphones. In certain embodiments, each mobile device in the plurality of mobile devices is connected to at least two other mobile devices. In the same or other embodiments, one of more mobile devices in the plurality of mobile devices each includes two microphones. Furthermore, one or more mobile devices in the plurality of mobile devices may perform both noise suppression and echo cancellation.

In certain embodiments, a data stream transmitted from one mobile device to the remaining mobile devices in the plurality of mobile devices includes data packets generated by a microphone and an audio processing system of the one mobile device. In the same or other embodiments, transmitted data packets are generated by a media player of the one mobile device. The data stream may correspond to an audio signal and/or to a video signal. In certain embodiments, the method involves communicating physical locations of mobile devices to all mobile devices in the plurality of mobile devices and, in further specific embodiments, rearranging the communication session based on the physical locations of mobile devices in the plurality of mobile devices.

Other features, examples, and embodiments are described below.

DESCRIPTION OF EXEMPLARY EMBODIMENTS

Figure 1:
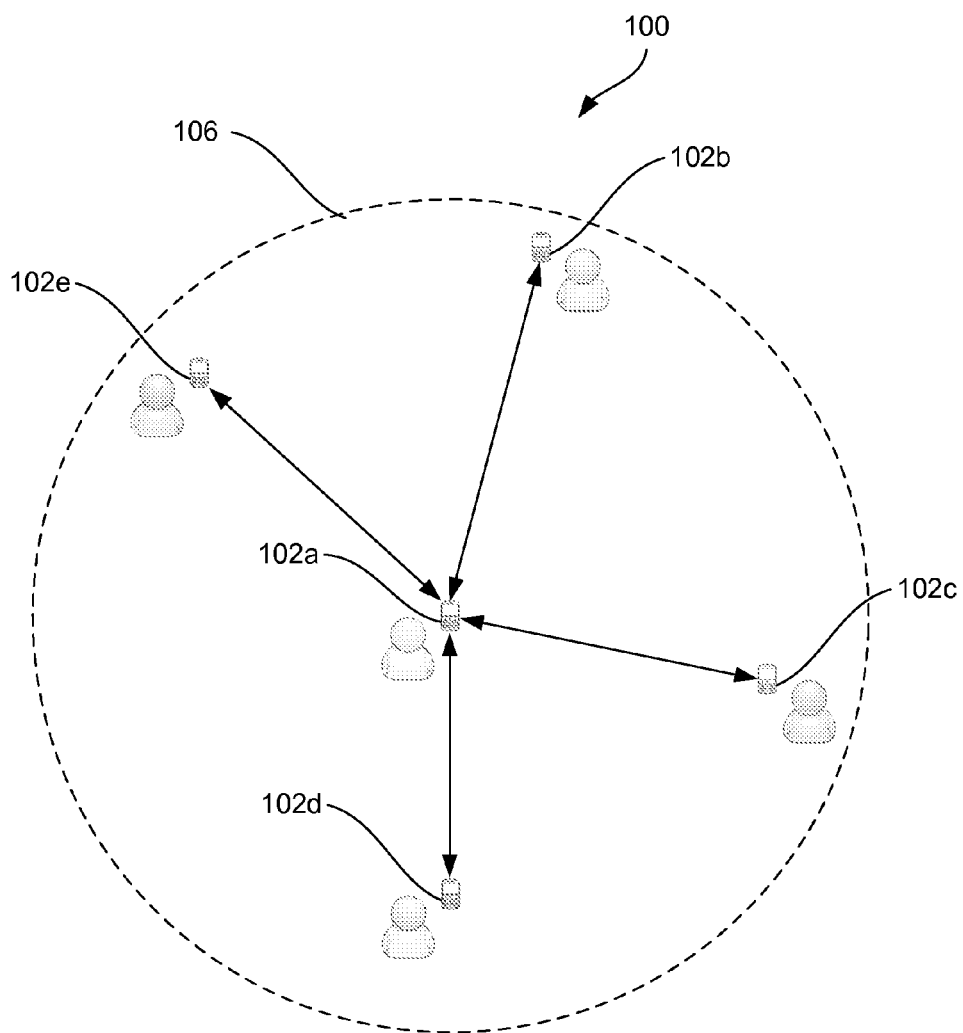
FIG. 1 is a schematic representation of an example system including multiple mobile devices connected according to one topology, in accordance with certain embodiments.

The methods and systems described herein allow communication between multiple mobile devices using a local network. A communication session may be established between two or more devices using a Wi-Fi, Bluetooth, Near Field Communication (NFC), or some other local network protocols. Usage of local networks restricts how far mobile devices can be positioned from each other. However, establishing local networks using mobile devices themselves eliminates the need for and reliance on external infrastructures, which are often not available in remote locations or in some geographically dynamic systems, such as moving users.

Such local network communication may be used for conferencing, sharing media files, and other purposes. Quite often, a group of people that need to share audio and video information are located close to each (i.e., in the same geographic location). Some examples include doctors in the same hospital facility, security personnel in the same shopping mall, or even a peloton of bicyclists. These groups do not always have access to global communication networks, such as the Internet or phone lines, because of their location or mobility. For example, bicyclists may train in remote areas that do not have access to common communication networks. Even if this access is available, it may not be stable or economical. For example, a peloton may include 20-30 bicyclists who train together for a few hours each day. Even relatively inexpensive mobile phone services may become prohibitively expensive in such scenarios. Furthermore, it may be desirable to exclude mobile device users that are not present at the same time. For example, when doctors are dispatched for an emergency, one may want to rely only on the doctors who are currently present in the facility rather than all doctors who are on staff with this hospital.

One application for such communication through a local network is conducting teleconference equivalents among multiple local users. Most people are equipped with mobile devices, such as mobile phones, music players, and/or portable game consoles that have both audio inputs and outputs and local network interfaces. Multiple users may easily establish a communication session between mobile devices using a local network, such as a Wi-Fi network connection. This eliminates a need for a wireless cellular network, the Internet, or other forms of global networks. Once the communication session is established, the mobile devices may transmit data streams among themselves or, in more specific embodiments, from one mobile device in that network to the remaining mobile devices. As such, the conference participants may talk to each other (i.e., participate in a local social conference) using a local network connection (e.g., a Wi-Fi connection) and communicate as a group without the need of cellular wireless network or any other global networks. The functionality of noise suppression, noise cancellation, echo cancellation, and other noise reduction technology provided by hardware and software, including noise reduction chipsets, may insure high quality communication in noisy environments.

Another aspect is the usage of microphone noise suppression and echo cancellation to improve the voice quality of the conference call. A noise component, which includes all undesirable audio signals, such as environment noise, echo, and other types, can make telecommunication between participants difficult or even impossible. In general, the poor audio quality transmitted by one participant can affect the user experience of the group. Similarly, an echo transmitted by one participant can affect the user experience of the group, and can be improved with echo cancellation.

The present technology may utilize Wi-Fi or other wireless connectivity to verify the group coherence control and alert the group members when one of the participants is isolated from the group. The group coherence is verified by each participant mobile device, such as a mobile phone, as it attempts to connect to the mobile device of the next participant in a radio-link chain. If the next mobile device cannot be found in a proximity radius around the current mobile device, then the notification of which participant is not connected to the radio-chain and the current mobile device is passed to the previous mobile device in the chain. The procedure is repeated until all participant mobile devices have been notified. The mobile device users can be notified with audio, visual, and/or other alarms.

The audio sharing feature may allow the users to share music, other played-back audio, or other audio content when participating in group activities, such as biking. In this mode, the audio and/or video data available on one mobile device may be broadcast to the audio devices of the group. A proximity warning feature may set an alarm if one of the participant device's signal fades away, thereby indicating that the user was left behind (e.g., proximity not detected). This local network approach to connectivity allows participants to have a conference call even in remote areas where global networks are not accessible or are cost prohibitive.

Mobile devices may be interconnected into a local network according to different topologies and schemes. FIG. 1 is a schematic representation of an example system 100 including multiple mobile devices 102a-102e connected according to a star topology, in accordance with certain embodiments. In this example, mobile device 102a represent a central hub, while mobile devices 102b-102e are each independently connected to mobile device 102a using separate point-to-point connections. The main feature of this type of local network is that all of the nodes on the network may be connected to one central hub. All traffic that traverses the network passes through that central hub. The hub may also act as a signal repeater. This is the easiest topology to design and implement, and adding additional nodes may be relatively simple.

A central hub represented by mobile device 102a may be selected by its location (e.g., a central location), capabilities of mobile device 102a (e.g., the device with the most processing power), or some other features. The communication may be maintained as long as mobile devices 102b-102e are within the range 106 of mobile device 102a. When a new device enters the range 106, it may register with mobile device 102a and participate in the communication session. In certain embodiments, adding new devices to the local network and dropping existing devices from the network may be performed without interfering with an existing communication session. In the same or other embodiments, when one of the existing devices loses a point-to-point link with mobile device 102a, mobile device 102a may generate an alarm.

Overall, mobile device 102a may generate notices to other devices present in the network when new devices are added or existing devices are dropped from the network. This feature may be useful to maintain group coherency.

In addition to being simple in implementation, the star topology is more efficient when most of the data streams are generated by mobile device 102a. For example, mobile device 102a may have a media player to play media files and produce an audio output. These media files may be converted into corresponding data streams and sent by mobile device 102a to all other mobile devices in the network. These data streams may also include a component corresponding to speech of the user of mobile device 102a. This approach may be useful in a situation when a coach or an instructor is assigned as a user of mobile device 102a. In certain embodiments, the data streams sent by mobile device 102a to all other mobile devices in the network may include components corresponding to speech or media files for the other users of the other mobile devices connected to mobile device 102a (e.g., the central hub in this star topology example). Overall, the star network may provide substantial advantages when most of the data streams are generated centrally.

However, failure of mobile device 102a will also cause the failure of the overall network. For example, mobile device 102a may lose power or get out of range, thereby causing the entire network to shut down. Other network topologies may be used to address this problem.

Figure 2:
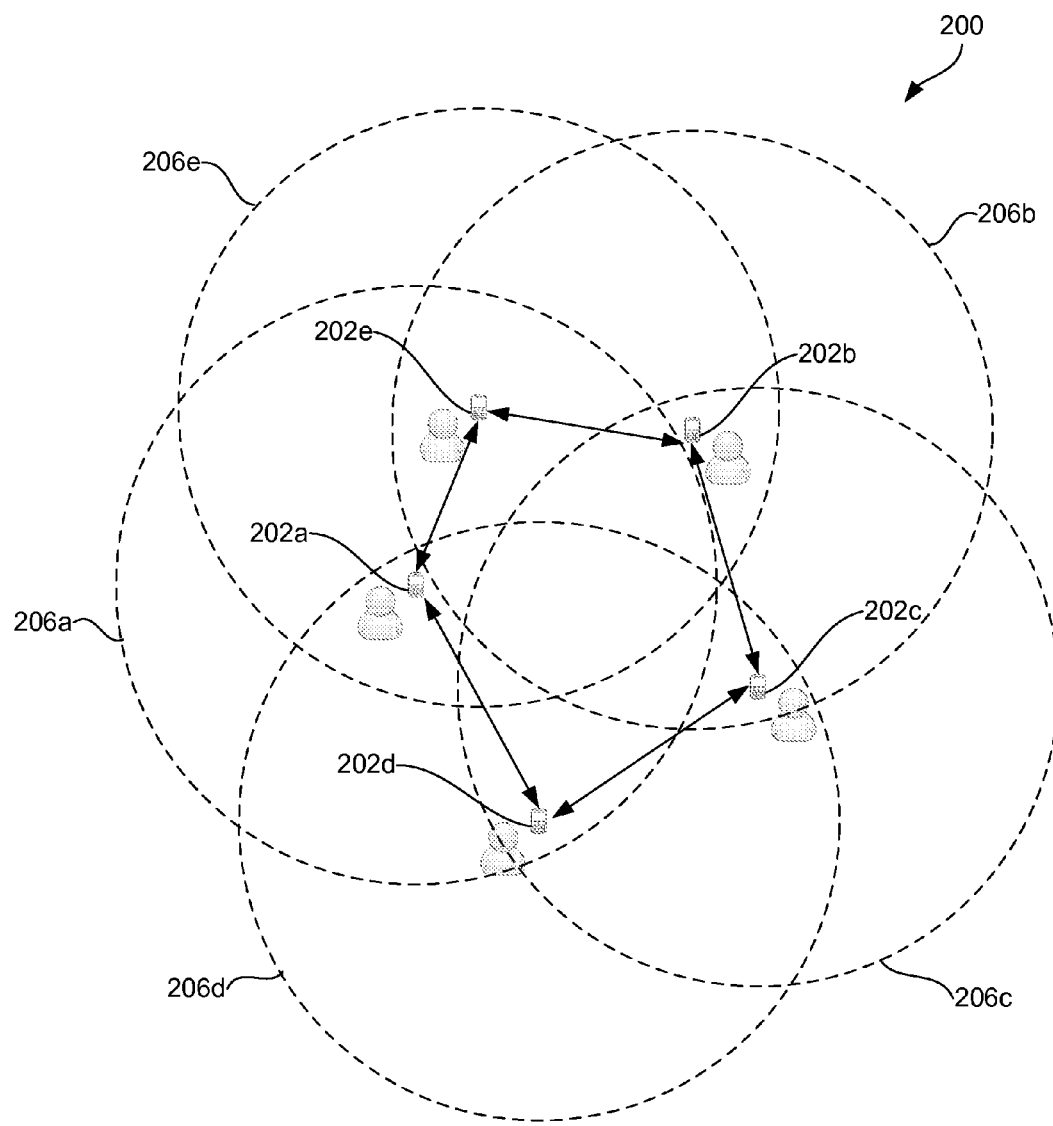
FIG. 2 is a schematic representation of an example system including multiple mobile devices connected according to another topology, in accordance with certain embodiments.

FIG. 2 is a schematic representation of a system 200 including multiple mobile devices 202a-202e connected according to a ring topology, in accordance with certain embodiments. For purposes of this document, a ring network topology is set up in a circular fashion in which data travels around the ring in one direction and each mobile device on one side acts as a repeater with respect to the signal sent from another side in order to keep the signal strong as it travels. Each device incorporates a receiver for the incoming signal and a transmitter to send the data on to the next device in the ring. This type of network is dependent on the ability of the signal to travel around the ring.

In the example shown in FIG. 2, mobile device 202a may be connected with mobile device 202e and mobile device 202d. These two connections may be maintained as long as mobile device 202a is operational and stays within range 206e of mobile device 202e and within range 206d of mobile device 202d (or, from another perspective, as long as mobile devices 202e and 202d stay within range 206a of mobile device 202a). Of course, this assumes all three devices remain operational. It is important to note that proximity of the remaining two mobile devices 202b and 202c in this example with respect to mobile device 202a is irrelevant to the two network connections described above. As such, assuming the same range of mobile devices 202a-202e, a local network that has a ring topology may be spatially larger than a network that has a star topology.

In a similar manner, mobile device 202b is connected with mobile device 202e and mobile device 202c. These two connections may be maintained as long as, mobile device 202b is operational and stays within range 206c of mobile device 202c and within range 206e of mobile device 202c (or, from another perspective, as long as mobile devices 202e and 202c stay within range 206b or mobile device 202b). Another connection in this ring type network may be between mobile devices 202c and 202d, which are also shown positioned within ranges 206d and 206c, respectively. Overall, mobile devices 202a-202e may be interconnected using five connections, and each device may have two connections. Other types of networking schemes that may be used for local communication networks, include mesh networking, fully connected and partially connected implementations.

Figure 3:
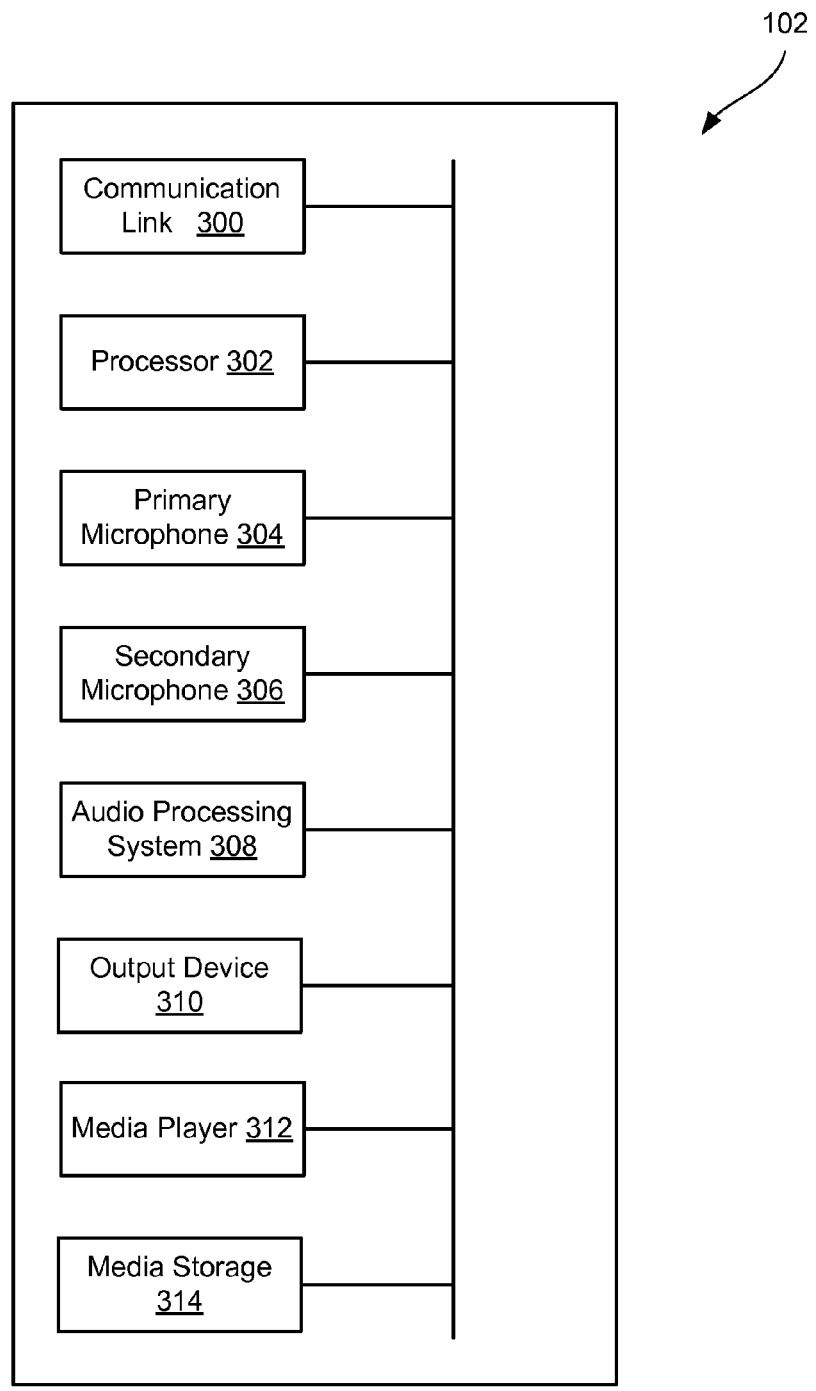
FIG. 3 is a schematic representation of various components of the mobile device, in accordance with certain embodiments.

FIG. 3 is a schematic representation of various components of mobile device 102, in accordance with certain embodiments. In exemplary embodiments, mobile device 102 is a device that includes communication link 300, processor 302, primary microphone 304, secondary microphone 306, audio processing system 308, output device 310, media player 312, and/or media storage 314. Not all of these components need to be present in mobile device 102. Furthermore, other components may be used as well. In certain embodiments, mobile device 102 includes one microphone (e.g., primary microphone 304) and communication link 300. Audio signals received by the microphone 304 may be sent in a raw format to other devices using communication link 300. As explained above, communication link 300 may support Wi-Fi, Bluetooth, and/or some other local communication protocol. In another embodiment, mobile device 102 also includes audio processing system 308, which in certain embodiments may be physically integrated into the microphone. Audio processing system 308 may be used to perform noise suppression and/or echo cancellation right at mobile device 102 before the corresponding data stream is sent to other devices.

Communication link 300 may be configured to send and receive signals to other devices through a local network. In some embodiments, communication link 300 includes an antenna or some other type of transmitter. Processor 302 may include hardware and/or software configured to perform local processing, such as performing local noise suppression or, more specifically, stationary noise suppression. Processor 302 may also control operations of various other devices. Audio processing system 308 may be configured to receive the acoustic signals from an acoustic source via primary and secondary microphones 304 and 306 and process these acoustic signals in addition to or instead of processor 302. Primary and secondary microphones 304 and 306 may be spaced a distance apart in order to allow for energy level differences between them. After reception by microphones 304 and 306, the acoustic signals may be converted into electrical signals (i.e., a primary electrical signal and a secondary electrical signal). The electrical signals may themselves be converted by an analog-to-digital converter (not shown) into digital signals for processing, in accordance with some embodiments. In order to differentiate the acoustic signals, the acoustic signal received by primary microphone 304 is herein referred to as the primary acoustic signal, while the acoustic signal received by secondary microphone 306 is herein referred to as the secondary acoustic signal. It should be noted that embodiments of the present invention may be practiced utilizing any plurality of microphones. In exemplary embodiments, the acoustic signals from output device 310 may be included as part of the (primary or secondary) acoustic signal. The primary acoustic signal and the secondary acoustic signal may be processed by audio processing system 308 to produce a signal with an improved signal to noise ratio for transmission across a communications network and/or routing to the output device. Output device 310 is any device which provides an audio output to a listener (e.g., an acoustic source). For example, output device 310 may comprise a speaker, an earpiece of a headset, or a handset on mobile device 102.

In various embodiments, where the primary and secondary microphones 304 and 306 are omni-directional microphones that are closely-spaced (e.g., 1-2 cm apart), a beamforming technique may be used to simulate a forward-facing and backward-facing directional microphone response. A level difference may be obtained using the simulated forward-facing and backward-facing directional microphone. The level difference may be used to discriminate speech and noise in, for example, the time-frequency domain, which can be used in noise and/or echo reduction/suppression.

Embodiments of the present invention may be practiced on any device that is configured to receive and/or provide audio such as, but not limited to, cellular phones, phone handsets, headsets, and systems for teleconferencing applications.

Some or all of the above-described modules can be comprised of instructions that are stored on storage media. The instructions can be retrieved and executed by processor 302. Some examples of instructions include software, program code, and firmware. Some examples of storage media comprise memory devices and integrated circuits. The instructions are operational when executed by processor 302 to direct processor 302 to operate in accordance with embodiments of the present invention. Those skilled in the art are familiar with instructions, processor(s), and (computer readable) storage media.

In certain embodiments, mobile device 102 may also include media player 312 and media storage 314. These components may be used to generate audio and video output on mobile devices 102, and users may choose to share this output to other devices in the local network.

Figure 4:
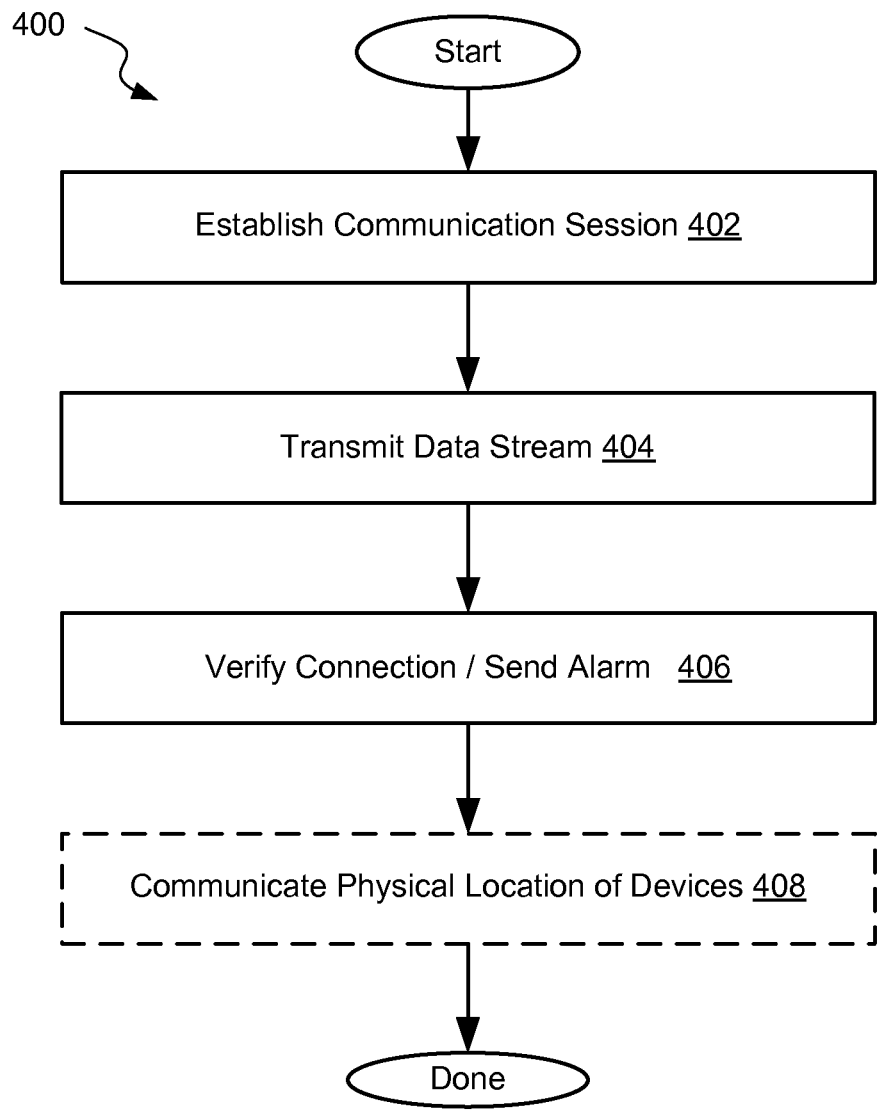
FIG. 4 is a process flow chart corresponding to a method for communicating between multiple mobile devices, in accordance with certain embodiments.

FIG. 4 is a process flow chart corresponding to method 400 for communicating between multiple mobile devices, in accordance with certain embodiments. The method 400 may commence with establishing a communication session between multiple mobile devices using a local communication network during operation 402. Various examples of mobile devices and communication networks are described above. In specific example embodiments, a Wi-Fi network is used to interconnect multiple mobile devices. In certain embodiments, mobile devices are mobile phones. However, other devices having a local network interface can be used as well. In general, each mobile device in the plurality of mobile devices interconnected by the local network includes a corresponding communication link.

The mobile devices may be interconnected according to various networking topologies. In certain embodiments, the mobile devices are interconnected according to a ring topology, in which each device is connected to two other devices. An example of the ring topology is explained above with reference to FIG. 2.

In other embodiments, the mobile devices may be interconnected according to a star topology, in which one device is a master device. An example of the ring topology is explained above with reference to FIG. 1. The master device is connected individually to all other devices. These other devices are connected only to the master device and may not have any other connections. In these embodiments, one of the users may select or otherwise designate his or her mobile device as a master device. This selection may be based on geographic location of the mobile devices, data flows, and other considerations. In certain embodiments, a local network may designate one device as a master based on one of more of these criteria.

In certain embodiments, a number of devices and even a network scheme may be changed after establishing an initial communication session. For example, a mobile device may be added to the local network or dropped from the network after the teleconference commences. When the device is dropped from the network, one or more devices may activate an alarm to inform other devices about participation changes or other changes.

Each mobile device in the plurality of interconnected mobile devices includes at least one microphone and an audio processing system configured to perform noise suppression and/or echo cancellation. In certain embodiments, the audio processing system performs both of these functions. Additional features of the audio processing system are described above with reference to FIG. 3. In certain embodiments, one or more mobile devices may each include multiple microphones, such as a primary microphone and secondary microphone as explained above.

Each mobile device in the plurality of interconnected mobile devices is configured to produce a data stream for communicating with one or more other devices in the plurality of mobile devices. The number of communication links depends on the communication scheme and type of the device. The data stream may be produced by a microphone, processor, audio processing system, or some other component of the mobile device. The data stream is transmitted and received by the communication link of the mobile device as explained above with reference to FIG. 3.

The method 400 may proceed with transmitting the data stream from one mobile device to all remaining mobile devices during operation 404. The user of the transmitting mobile device may be talking to an audio input of that device to produce the data stream and/or may activate a media file for transmission over the local network to all other devices. When multiple data streams are produced at the same time, the local network may employ various techniques for resolving the conflict and determining which data stream/data packets should be dropped.

The method 400 may proceed with verifying connections between mobile devices in the local networks and sending alarms during operation 406. As explained above, some devices may be dropped from the network because their users choose to do so and/or because the mobile devices left the communication range, or there may be some radio signal interference. Regardless of the cause, other devices may be informed that one or more devices are not part of the network. For example, during a teleconference, participants may need to know who is present at any particular time. This notification may involve visual and/or audio signals. In specific embodiments, the method involves sending an alarm to the remaining mobile devices if any mobile device is found to be disconnected from the local network. In certain embodiments, any mobile device in the network is capable of determining this loss of connection and sending the corresponding alarm. Operation 406 may be repeated at predetermined intervals to ensure proper updates to the devices of the network. Similar to situations when mobile devices are dropped from the network, alarms may be generated when new devices are added to the network.

The method 400 may involve communicating physical locations of mobile devices to other mobile devices during optional operation 408. In other words, mobile devices connected to the local network share their locations with each other. The shared location may be relative (e.g., relative to the other devices in the network). The relative location may be determined based on the devices' ability to connect to other devices. In other embodiments, the shared location may be an absolute map location and may be determined by a Global Positioning System (GPS) or other systems and methods. When the locations are determined and shared, the method may proceed with rearranging the communication session based on the physical locations of the mobile devices. For example, a new master device may be identified for a star topography.

In certain embodiments, the method 400 may involve various data processing operations implemented on mobile devices. These data processing operations may be performed prior to transmitting the data from one device to another. The data processing operations may be performed in stages. The first stage of processing is the transform stage. The transform stage uses a Fast Cochlea Transform (FCT) to convert the time-domain signal into a set of band-passed cochlear signals or Analytic Cochlea Samples (ACSs). The FCT implements a series of cascaded, complex-valued, first-order Infinite Filter Response (IIR) filters. The subband center frequencies may be spread logarithmically in frequency over roughly five octaves for the narrowband configuration and seven octaves for the wideband configuration, and the bandwidths of the subbands correspond roughly to the critical bandwidths in the human auditory system. Further details regarding the first stage are described in U.S. patent application Ser. No. 11/441,675, incorporated by reference herein in its entirety.

The second stage of processing is the cancellation stage. The cancellation stage may use a beamformer to subtract from the primary microphone signal noise and/or echo components that are correlated with the other microphone signal (s). An example of a beamformer is Null-Processing Noise Subtraction (NPNS). Further details regarding NPNS are described in U.S. patent application Ser. No. 12/422,917, incorporated by reference herein in its entirety.

The third stage of processing is the post-filter stage. In the post-filter stage, a time-frequency mask may be applied to the output ACS of the cancellation stage to produce the modified ACS, thereby achieving additional noise and/or echo reduction. The time-frequency mask may be determined using an analysis path sub-system that may include feature extraction modules, source inference modules, and mask generation modules. Feature extraction may include frame energy estimation, Inter-microphone Level Difference (ILD) computation, and pitch estimation. Source inference may include noise estimation and/or noise and speech modeling. Mask generation may include a Wiener filter and Voice Quality Optimized Suppression (VQOS). The VQOS is described in further detail in U.S. patent application Ser. No. 12/832,901, incorporated by reference herein in its entirety.

The fourth stage of processing is the reconstruction stage. In the reconstruction stage, the modified ACS may be added and delayed in each subband to obtain a time-domain modified noise and/or echo suppressed signal. The present technology provides improved noise cancellation and may be applied to both close-talk as well as hand-held speakerphone use cases. Further details regarding the fourth and other stages is described in U.S. patent application Ser. No. 11/343,524, incorporated by reference herein in its entirety Other stages may be performed to process audio signals by the present technology. For example, the present system may transform acoustic time domain signals to the cochlea domain as subband signals, extract features from the subband signals, cancel noise in the subband signals via noise subtraction techniques, generate a multiplicative mask and apply the multiplicative mask to the noise-subtracted subband signals via a noise suppression or echo-cancellation process, transform the noise suppressed cochlea subband signals back to the time domain, and perform post processing to the signals.

A highly directional response of a device may indicate that a beamformer is used. If a device suppresses noise by a greater amount than the theoretical limit for noise cancellation in diffuse noise based upon the microphone spacing, this may indicate that a post-filter is used. If the amount of suppression being applied varies across frequencies (e.g., voice harmonics are not attenuated, but the noise between the harmonics is attenuated) or the latency of their system can be measured and is greater than ~5 ms, these may indicate that a subband analysis using a transform stage and reconstruction stage is used.

Figure 5:
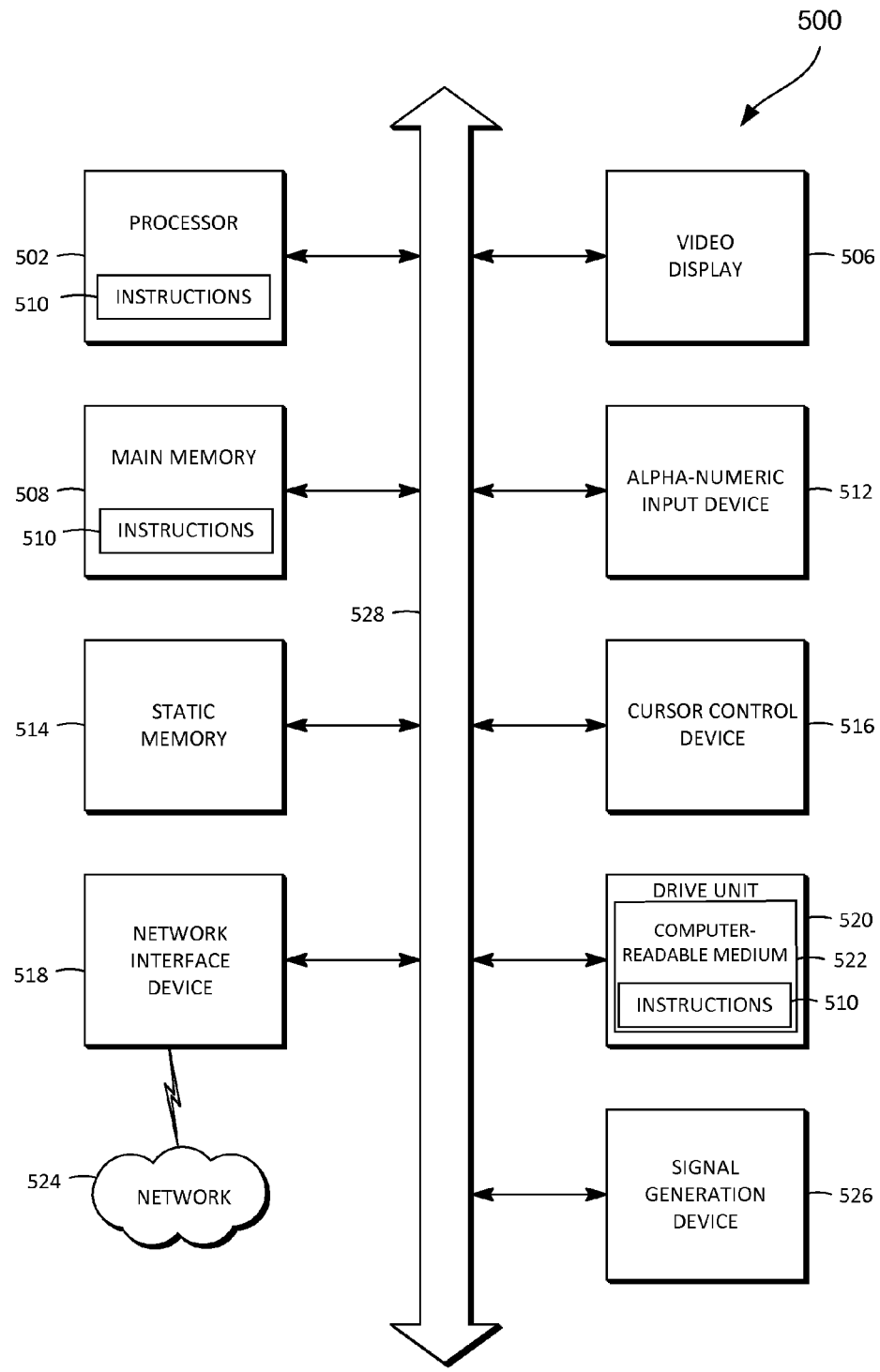
FIG. 5 is a diagrammatic representation of an example machine in the form of a computer system, within which a set of instructions for causing the machine to perform any one or more of the methodologies discussed herein may be executed.

FIG. 5 is a diagrammatic representation of an example machine in the form of a computer system 500, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 502 (e.g., a central processing unit (CPU), a graphics processing unit (GPU), or both), and a main memory 508 and static memory 514, which communicate with each other via a bus 528. The computer system 500 may further include a video display unit 506 (e.g., a liquid crystal display (LCD)). The computer system 500 may also include an alpha-numeric input device 512 (e.g., a keyboard), a cursor control device 516 (e.g., a mouse), a voice recognition or biometric verification unit, a disk drive unit 520, a signal generation device 526 (e.g., a speaker), and a network interface device 518. The computer system 500 may further include a data encryption module (not shown) to encrypt data.

The disk drive unit 520 includes a computer-readable medium 522 on which is stored one or more sets of instructions and data structures (e.g., instructions 510) embodying or utilizing any one or more of the methodologies or functions described herein. The instructions 510 may also reside, completely or at least partially, within the main memory 508 and/or within the processors 502 during execution thereof by the computer system 500. The main memory 508 and the processors 502 may also constitute machine-readable media.

The instructions 510 may further be transmitted or received over a network 524 via the network interface device 518 utilizing any one of a number of well-known transfer protocols (e.g., Hyper Text Transfer Protocol (HTTP)).

While the computer-readable medium 522 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media may also include, without limitation, hard disks, floppy disks, flash memory cards, digital video disks, random access memory (RAM), read only memory (ROM), and the like.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

The invention claimed is:

1. A method for communicating between a plurality of mobile devices, the method comprising:
   establishing a communication session between mobile devices in the plurality of mobile devices using a local communication network,
      each mobile device in the plurality of mobile devices comprising a communication link for connecting to one or more other mobile devices in the plurality of mobile devices,
      each mobile device in the plurality of mobile devices further comprising at least one microphone and an audio processing system configured to perform one or more functions selected from the group consisting of noise suppression and echo cancellation, the one or more functions comprising transforming at least one acoustic signal into sub-band frequencies,
      each mobile device in the plurality of mobile devices configured to produce a data stream for communicating to the one or more other mobile devices in the plurality of mobile devices; and
   transmitting the data stream from one mobile device in the plurality of mobile devices to remaining mobile devices in the plurality of mobile devices using the local communication network.

2. The method of claim 1, wherein the local communication network is a Wi-Fi network.

3. The method of claim 1, wherein the mobile devices in the plurality of mobile devices are interconnected according to a ring topology.

4. The method of claim 1, wherein:
   the mobile devices in the plurality of mobile devices are interconnected according to a star topology; and
   establishing the communication session between the mobile devices in the plurality of mobile devices using the local communication network comprises selecting a master device from the plurality of mobile devices to establish the star topology.

5. The method of claim 4, wherein selecting the master device from the plurality of mobile devices is performed by a user.

6. The method of claim 1, further comprising verifying connections between the mobile devices in the plurality of mobile devices.

7. The method of claim 6, further comprising sending an alarm to the plurality of mobile devices if any mobile device in the plurality of mobile devices is found to be disconnected;
   wherein any mobile device in the plurality of mobile devices is configured to determine that any other mobile device in the plurality of mobile devices is disconnected and is further configured to generate and transmit the alarm.

8. The method of claim 6, further comprising repeating the connection verification operation at predetermined intervals.

9. The method of claim 1, wherein the plurality of mobile devices comprises one or more mobile phones, at least one of the mobile phones having at least two microphones.

10. The method of claim 1, wherein each mobile device in the plurality of mobile devices is connected to at least two other mobile devices using the local communication network.

11. The method of claim 1, wherein one or more mobile devices in the plurality of mobile devices performs noise suppression and echo cancellation.

12. The method of claim 1, wherein the data stream transmitted from the one mobile device to the remaining mobile devices comprises data packets generated by a microphone and the audio processing system of the one mobile device.

13. The method of claim 1, wherein the data stream transmitted from the one mobile device in the plurality of mobile devices to the remaining mobile devices in the plurality of mobile devices comprises data packets generated by a media player of the one mobile device.

14. The method of claim 1, wherein the data stream transmitted from the one mobile device in the plurality of mobile devices to the remaining mobile devices in the plurality of mobile devices comprises data packets generated by the one mobile device based on data packets received from at least one of the remaining mobile devices.

15. The method of claim 1, wherein the data stream corresponds to at least one of: an audio signal, and both an audio signal and a video signal.

16. The method of claim 1, further comprising communicating physical locations of the mobile devices in the plurality of mobile devices to all mobile devices in the plurality of mobile devices.

17. The method of claim 16, further comprising rearranging the communication session based on the physical locations of mobile devices in the plurality of mobile devices.

18. A method for communicating among at least three mobile devices, the method comprising:
   establishing a communication session between the at least three mobile devices using a local communication network, one mobile device of the at least three mobile devices having at least two microphones and being configured to perform one or more functions selected from the group consisting of noise suppression and echo cancellation;
   receiving, by the one mobile device, raw data packets representing at least one captured sound;
   processing the raw data packets with the one or more functions selected from the group consisting of noise suppression and echo cancellation to form processed data packets; and
   communicating the processed data packets from the one mobile device to at least one other of the at least three mobile devices using the local communication network, the communicating using the local communication network being via a wireless protocol other than a wireless cellular network protocol.

19. The method of claim 18, wherein:
   the one mobile device of the at least three mobile devices is configured to perform both noise suppression and echo cancellation; and
   the processing of the raw data packets to form processed data packets uses both noise suppression and echo cancellation.

20. The method of claim 18, wherein the at least one of the other of the at least three mobile devices has only one microphone.

* * * * *